(12) United States Patent
Stammberger et al.

(10) Patent No.: US 9,199,534 B2
(45) Date of Patent: Dec. 1, 2015

(54) DRIVE FOR AN INDUSTRIAL TRUCK WITH STEERING SUPPORT

(71) Applicant: ZF Friedrichshafen AG, Friedrichshafen (DE)

(72) Inventors: Christian Stammberger, Vilshofen (DE); Dirk Bald, Passau (DE); Michael Hammer, Fürstenstein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/153,513

(22) Filed: Jan. 13, 2014

(65) Prior Publication Data

US 2014/0196971 A1    Jul. 17, 2014

(30) Foreign Application Priority Data

Jan. 14, 2013    (DE) .......................... 10 2013 200 388

(51) Int. Cl.
    *B60K 17/30*    (2006.01)
(52) U.S. Cl.
    CPC ...................................... *B60K 17/30* (2013.01)
(58) Field of Classification Search
    USPC .............................. 180/252, 253, 65.51, 65.3
    See application file for complete search history.

(56) References Cited

U.S. PATENT DOCUMENTS

| | | | | |
|---|---|---|---|---|
| 1,391,779 | A * | 9/1921 | Kline | 280/124.118 |
| 2,860,523 | A * | 11/1958 | Lerman | 74/494 |
| 6,349,781 | B1 * | 2/2002 | Kruse | 180/7.2 |
| 6,464,025 | B1 * | 10/2002 | Koeper et al. | 180/19.2 |
| 6,991,059 | B2 * | 1/2006 | Stubbe | 180/253 |
| 7,644,806 | B2 * | 1/2010 | Huther | 187/231 |
| 7,654,350 | B2 * | 2/2010 | Manken et al. | 180/65.51 |
| 7,669,684 | B2 * | 3/2010 | Rogg | 180/264 |
| 8,662,234 | B2 * | 3/2014 | Roeder | 180/252 |
| 2005/0247508 | A1 * | 11/2005 | Gilliland et al. | 180/402 |
| 2006/0032695 | A1 * | 2/2006 | Lohmann et al. | 180/315 |
| 2007/0163816 | A1 * | 7/2007 | Schena et al. | 180/19.1 |
| 2011/0231059 | A1 * | 9/2011 | Hanna et al. | 701/41 |

FOREIGN PATENT DOCUMENTS

GB    1 443 263    7/1976

OTHER PUBLICATIONS

German Patent Office Search Report, Nov. 4, 2013.

* cited by examiner

*Primary Examiner* — Kevin Hurley
*Assistant Examiner* — Gabriela C Craciun
(74) *Attorney, Agent, or Firm* — Dority & Manning, P.A.

(57) ABSTRACT

A drive for an industrial truck with at least one drive motor for driving a wheel of the industrial truck and at least one steering motor for supporting a steering movement of the wheel around a steering axle also features a drawbar for guiding the steering or driving movement by applying a load on the drawbar. The drive motor also rotates upon a steering movement of the wheel, whereas the drawbar is connected in a torque-proof manner, relative to the steering axle, with a component also rotating upon a steering movement of the wheel.

9 Claims, 2 Drawing Sheets

DRIVE FOR AN INDUSTRIAL TRUCK WITH STEERING SUPPORT

FIELD OF THE INVENTION

Embodiments of the present invention relate to a drive for an industrial truck, in particular a drive that provides steering support.

BACKGROUND

In warehousing and upon the transport of goods, hand-driven forklifts and industrial trucks, which are also known as lift trucks or pedestrian trucks, are used. In order to reduce the physical stress of an operator or a warehouse worker, such vehicles are often equipped with motors for driving support and/or steering support. Based on the preferred use in closed buildings and the emissions behavior, electric motors are frequently used both for the operation and for steering, for example as drive motors and steering motors for the support of steering movements.

Traditional non-motorized supported industrial trucks usually feature a drawbar, which serves the purpose of specifying a steering direction or a driving direction by the operator.

While, for systems purely driven by motors, the drawbar solely serves the purpose of determining the driving direction and/or driving speed desired by the operator, industrial trucks and lift trucks also exist whereby the drive motors and steering motors have only a supporting effect such that a steering force or traction force and/or shear force applied by the operator is supported by the relevant motor. This requires, on the one hand, that such a force can be measured, for which a set of sensors on or in the drawbar has been established. On the other hand, this requires a mechanical connection of the drawbar with the rest of the drive, which can transfer both a traction force and/or shear force to the vehicle frame, and a steering force for steering a wheel of the drive around its steering axle. This is, in addition to a mechanical coupling of a steering motor with the steered wheel and/or the steered axle, a mechanical connection between the drawbar and the steered wheel and/or the steered component assembly is also necessary.

Drawbar-controlled industrial trucks without steering support are often driven with an electric drive unit, which can be pivoted around a vertical axis with the assistance of the drawbar. The drive may, for example, consist of an upright electric motor and a pivoting spur gear / bevel gear transmission, on the drive side of which a wheel or a running wheel, as the case may be, is mounted. These industrial trucks are steered by means of the force exerted by the operator on the drawbar, whereas the drawbar may be attached to, for example, the motor housing.

In the case of heavy industrial trucks, electrically controlled drive units are known for high loads and therefore high steering forces that arise on the drawbar. For steering that is purely operated by an electric motor, the drawbars are only used as transmitters or sensors, as the case may be, for guiding a steering movement.

There are also industrial trucks with electric steering support, with which the drawbar may be mechanically connected to the transmission, in order to transfer the steering movement of the drawbar directly to the transmission or a rotating component, as the case may be. Such industrial trucks frequently possess a turntable, in which a pinion of an electric steering motor engages, in order to support the steering movement and reduce the steering forces that an operator must apply. For industrial trucks with electric steering support, the drive motor or traction drive motor, as the case may be, is connected in a torque-proof manner with the vehicle frame, which requires a relatively complex design for the mechanical connection of the drawbar with the transmission of the drive motor. With some designs with steering support, the drawbar is rotatably mounted, for example, above the drive motor relative to the same, and a spur gear stage transfers the steering movement to a cardan shaft, which is guided at the traction drive motor and is connected to a gear, which, in addition to a pinion of the steering motor, engages in the turntable of the transmission. Such a complex control is intensive in terms of manufacturing costs, on the one hand, and maintenance, on the other hand, as, particularly in dirty environments of warehouses or the like, the moving parts of the shaft or the cardan shaft, as the case may be, must be lubricated on a regular basis. At the same time, such complex mechanical redirections can degrade the usability of such an industrial truck if, for example, the steering axle around which a wheel of the drive of the industrial truck rotates upon a steering movement is offset to the axis of the point of application of the drawbar, as, at that point, a haptic feedback or a feedback of the steering movement, as the case may be, can no longer satisfactorily reflect the actual steering angle of the wheel under certain circumstances, which can lead to faulty operation.

Thus, there is a need to make available a drive for an industrial truck that, with a provided support of a driving movement and at the same time a provided support of a steering movement, is more cost-effective and less maintenance-intensive than the previous drive.

SUMMARY OF THE INVENTION

Embodiments of the present invention address the need through a drive for an industrial truck in accordance with the appended claims. Additional objects and advantages of the invention will be set forth in part in the following description, or may be obvious from the description, or may be learned through practice of the invention.

Accordingly, embodiments of industrial trucks under the invention feature at least one drive motor for supporting a driving movement of a wheel of the industrial truck and at least one steering motor for supporting a steering movement of the wheel around a steering axle. There is also the possibility that the drive motor is not only supported, but solely carries out the driving movement. A drawbar serves the purpose of guiding the steering or driving movement by applying a load at the drawbar. Through the load applied at the drawbar, the user indicates both the direction of movement and also the speed of movement, which are supported both by the drive motor and also by the steering motor. Thereby, the drive unit is arranged in such a manner that the drive motor subsequently also turns upon a steering movement of the wheel, and that the drawbar is connected to a component also turning upon a steering movement of the wheel. The rotating of the drive motor upon a steering movement makes it possible to make available a simple drive for industrial trucks or forklifts, as the case may be, that is low-maintenance and cost-effective in terms of mechanics. Accordingly, a complex mechanism for transferring the steering force applied by the user to the electrically supported steering transmission can be avoided. Given the mechanical components that are omitted, maintenance costs are also reduced.

This is made possible by the fact that the drive unit comprising the drive motor and the transmission also rotates upon a steering movement, the steering movement thus follows. The drive unit is thus rotatable relative to the vehicle frame of the industrial truck around an axis that is parallel to the steering axle of the wheel or chassis of the industrial truck, as the case may be.

In accordance with some embodiments, the drawbar is connected to the drive motor at a side turned away from the driven wheel, which may enable a compact and cost-effective design. In addition, this type of linking in accordance with some embodiments of the invention makes it possible to design the connection between the drawbar and the drive motor and/or to an additional turning component of the drive or the drive unit in such a manner that the connection is located at the steering axle of the wheel. This can lead to direct feedback and/or a direct match of the position of the steered wheel and the orientation of the drawbar, which promotes the safe and intuitive control of an industrial truck equipped with such a drive. For the same reason, in accordance with some embodiments of the present invention, the steering axle of the wheel is coaxial to the drive shaft of an upright drive motor, which, with a simple constructional design, may entail a secure and intuitive maneuverability.

In accordance with additional embodiments of the present invention, the drawbar is connected to a housing of the transmission transferring the rotation of the drive motor to an axis of the driven wheel. In a constructively simple manner, this may make it possible to transfer the steering force applied by the operator to the steering and/or rotatable component assembly, whereas, at the same time, a complicated transfer mechanism, which could impair the feel of the steering, may be rendered unnecessary.

In accordance with some embodiments of the present invention, the motors used for driving, likewise for supporting the steering movement, are electric motors. In accordance with additional embodiments of the invention, the motors may also be hydraulic motors. Thus, hydraulically actuated rotating elements that are able to be supplied by a common electric motor may be used, which under certain circumstances may lead to a further energy savings, and thus to a greater run time of an embodiment of an industrial truck.

BRIEF DESCRIPTION OF THE DRAWINGS

Preferred embodiments of the present invention are described below, with reference to the attached figures. The following is shown.

DETAILED DESCRIPTION

Figure 1:
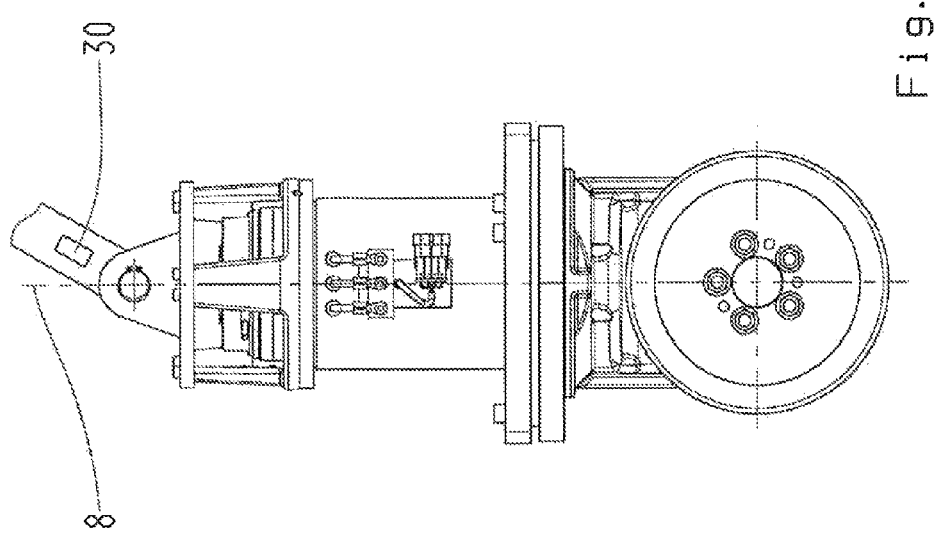
FIG. 1 a view of an embodiment of a drive for an industrial truck from two orthogonal directions.
Figure 1:
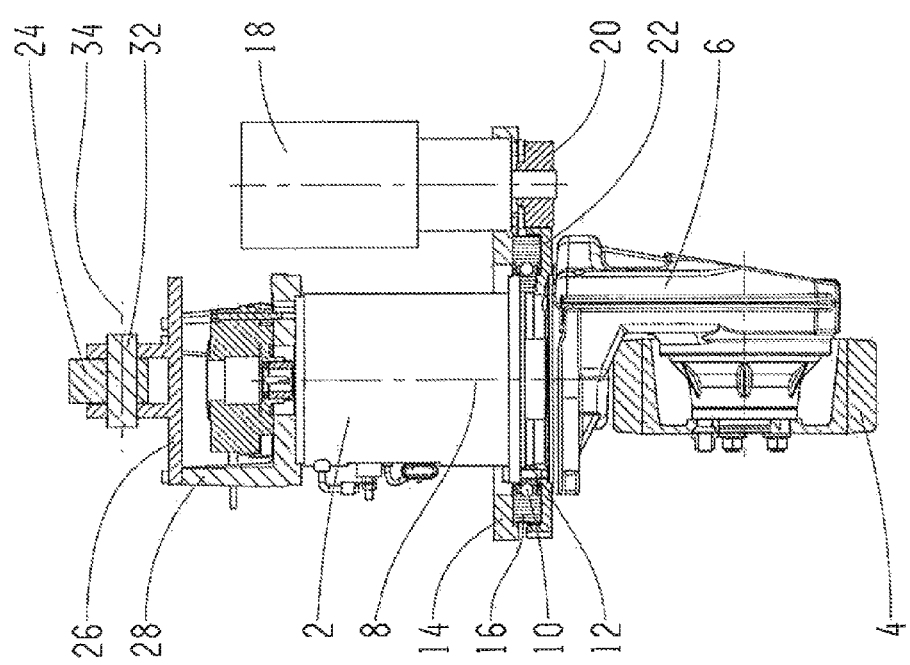

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Exemplary embodiments are described with reference to the attached figures. It should be noted in advance that the figures are not necessarily drawn to scale and that, to emphasize certain features or properties, certain components may be artificially emphasized by using a different line thickness or hatching.

It is explicitly pointed out that additional embodiments are not to be restricted by the special implementations shown in the figures. In particular, the fact that certain functionalities in the figures are described in terms of specific entities, specific function blocks or specific devices should not be construed in such a manner that such functionalities in additional embodiments should be or even need to be allocated in the same manner. In additional embodiments, certain functionalities allocated to separate components or units may be grouped into one single component and/or one single functional element, or functionalities united herein as one single element may be carried out in separate functional units or through several separate components.

In addition, it is pointed out that, if a special element or component is referred to as connected to another element, coupled with it or linked to it, this does not necessarily mean that this should be immediately and directly connected to the other component, coupled with it or linked to it. To the extent that this is meant, it is explicitly pointed out by describing that the element is directly connected to the additional element, directly coupled with it, or directly linked to it. This means that there are no other intervening elements imparting an indirect coupling and/or connection or linking. Moreover, in the figures, identical reference signs designate identical, functionally identical or functionally similar components that are able to be exchanged as substitutes with each other among the various following exemplary embodiments. As such, for a detailed description of such a component that is presented in a figure, there may be a reference back to the description of the component and/or construction element in another figure corresponding to it.

FIG. 1 shows, in the left image, a section through a drive for an industrial truck in accordance with one embodiment of the invention, and, in the right image, a side view of the drive of the industrial truck.

The drive for the forklift or industrial truck, as the case may be, features a drive motor 2 for supporting a driving movement of a wheel 4, which is driven through a transmission 6 of the upright drive motor 2. The transmission 6 is, together with the motor 2, rotatable relative to the steering axle 8, around the wheel 4 upon a steering movement. For this purpose, the drive unit comprising the drive motor 2 is rotatably mounted relative to the vehicle frame 14, which is not shown in detail here for reasons of simplicity. The mounting is carried out by means of a roller bearing 10, whereas a bearing inner ring 12 is connected in a torque-proof manner to the drive motor 2 and the transmission 6. The bearing inner ring 12 is in turn rotatable relative to a bearing outer ring 16 connected in a torque-proof manner to the vehicle frame 14.

The steering support is achieved by means of a steering motor 18, which is in turn connected in a torque-proof manner to the vehicle frame 14. The output shaft of the steering motor 18 drives a pinion 20, which is engaged with a swivel ring 22 in order to make available the steering support effect. Through a drawbar adapter 26, which is in turn connected to a motor adapter 28, the drawbar 24 is, at least in regard to the steering axle 8, connected in a torque-proof manner to the drive motor 2. In the present case, the drawbar adapter 26 is bolted to the motor adapter 28, whereas, in alternative embodiments, any other firmly bonded, positively locking or force-fitting connections may be selected. Simply for the sake of completeness, the right image of FIG. 1 shows a strain gauge or sensor 30, as the case may be, which may be used for the purpose of detecting a load applied by a user to a drawbar 24 and to calculate the steering support or driving support, as the case may be, from the determined load. The drawbar 24 is connected to the drawbar adapter 26 and thus to the drive motor 2 through a joint 32, which is formed by an axis 34, which is guided into two holes. Through this linking, the drawbar 24 is connected in a torque-proof manner to the drive motor 2 or the drive unit, as the case may be, relative to a movement around the steering axle 8, whereas this can be pivoted relative to the horizontal axis perpendicular to the steering axle 8. Thereby, an operator of the drive for an industrial truck may exert a steering force and/or may exert a steering torque at the drive unit, including a traction force, in order to drive (thus, to push or pull) the industrial truck. With the embodiment shown in FIG. 1, the connection of the drawbar 24 to the rotating component or to the rotating drive unit and the drive motor 2, as the case may be, is located on the steering axle 8, which leads to a particularly good ability to steer and intuitive operability of the drive for the industrial truck.

In other words, the embodiment of FIG. 1 shows a steered drive unit with a rotating traction drive motor. The transmission 6 with the running wheel is connected in a torque-proof manner to the turntable or swivel ring 22, as the case may be, and to the rotating ring of the swivel ring bearing along with the traction drive motor. The traction drive motor or the drive motor 2, as the case may be, possesses a torque-proof connection to the drawbar connection, which is connected to the drawbar 24 through the drawbar adapter 26 and the joint 32. The joint 32 allows a pivoting movement of the drawbar in relation to its axis. A pivoting movement around the vertical axis of the drive unit is transferred from the drawbar 24 to the drawbar adapter 26. Through the swivel ring bearing, the entire drive unit, including the traction drive motor, is thereby rotatably mounted in the vehicle frame 14. The steering unit, which can be driven (for example) electrically or hydraulically, is firmly connected to the vehicle frame 14, and drives the pinion 20, which is connected to the swivel ring 22. Through the drawbar 24, the vehicle operator may initiate a steering movement or a steering torque, as the case may be, directly into the drive unit. The sensor 30 may indicate whether a steering torque is present at the drawbar, such that, based on this signal, the control of the steering unit may be undertaken. The steering unit or the steering motor 18, as the case may be, may thereby be drawn upon to support the steering movement.

Figure 2:
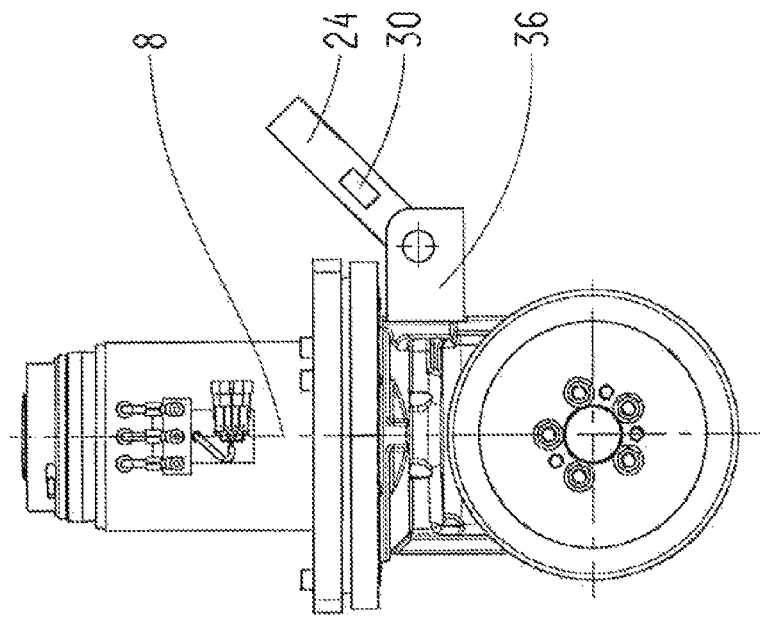
FIG. 2 a view of an additional embodiment of an industrial truck from two directions orthogonal to one another.
Figure 2:
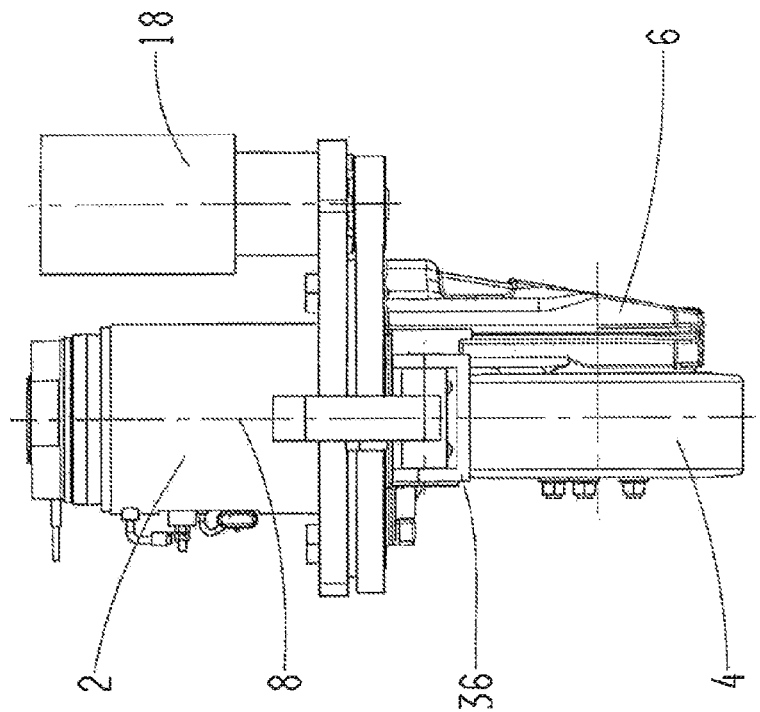

The embodiment shown in FIG. 2 concerns a variation of the embodiment shown in FIG. 1, such that there is only a brief description below of the differences with the embodiment shown in FIG. 1. Unlike the case shown in FIG. 1, with the embodiment shown in FIG. 2, the drawbar 24 is directly connected to the transmission through a drawbar adapter 36, such that a simple yet robust design of a drive for an industrial truck can be made available, without having to provide a complicated mechanism for merging the steering forces introduced through the drawbar 24 and that which is produced by means of the steering motor 18.

Although it has been described, on the basis of the embodiment shown in FIG. 1, that the drawbar 24 is connected in a torque-proof manner through a drawbar adapter 26 to the drive motor 2, with other embodiments, this torque-proof linking to the drive motor 2 may be carried out in any other manner. For example, the drawbar 24 may be, without the interposition of a motor adapter 28, bolted to the drive motor 2, or connected in other manners. However, the use of a motor adapter 28 and a drawbar adapter 26 matching this may be used, in the sense of a building block system, to couple nearly all motors of varying thicknesses with the drawbar 24 in accordance with one embodiment of the invention.

In summary, all embodiments of the present invention make it possible to, in a mechanically simple and robust, low-maintenance manner, make available a drive for an industrial truck with steering support and driving support, which makes it possible to intuitively and securely control the industrial truck.

Modifications and variations can be made to the embodiments illustrated or described herein without departing from the scope and spirit of the invention as set forth in the appended claims.

The invention claimed is:

1. A drive system for an industrial truck, comprising:
a drive motor mounted to a vehicle frame of the industrial truck and operably configured to provide driving movement to a drive wheel mounted on a rotatable steering axle of the industrial truck;
a steering motor operably configured to provide a steering movement to the steering axle;
a drawbar that controls the steering movement and driving movement responsive to a steering and driving force applied by an operator of the industrial truck to the drawbar;
the drive motor rotatable relative to the vehicle frame with rotation of the steering axle upon application of the steering movement;
the drawbar mechanically connected to the drive motor so as to also rotate with the drive motor upon the steering movement of the drive wheel; and
a transmission that transfers rotation of the drive motor to an axle of the drive wheel, the drawbar connected to a housing of the transmission.

2. The drive system as in claim 1, wherein the drawbar is connected in a rotationally fixed manner to a side of the drive motor opposite from the drive wheel.

3. The drive system as in claim 1, wherein the drawbar is connected in a rotationally fixed manner to a component of the steering axle that rotates with the steering movement of the drive wheel.

4. The drive system as in claim 3, wherein the drive motor comprises an output shaft that is coaxial to the steering axle.

5. The drive system as in claim 4, wherein the drawbar is also rotatable relative to a horizontal axis that is perpendicular to an axis of the steering axle.

6. The drive system as in claim 1, wherein the drive motor comprises an output shaft that is parallel to the steering axle.

7. The drive system as in claim 1, further comprising a transmission rotatably mounted relative to the vehicle frame that transfers rotation of the drive motor to an axle of the drive wheel, the transmission and drive motor rotatably driven relative to the vehicle frame by the steering motor mounted on the vehicle frame.

8. The drive system as in claim 7, further comprising a swivel ring connected to the drive motor, and a pinion gear that engages with the swivel ring, the pinion gear driven by the steering motor.

9. The drive system as in claim 8, wherein the steering motor is one of an electric or hydraulically operated motor.

* * * * *